Figure 1:
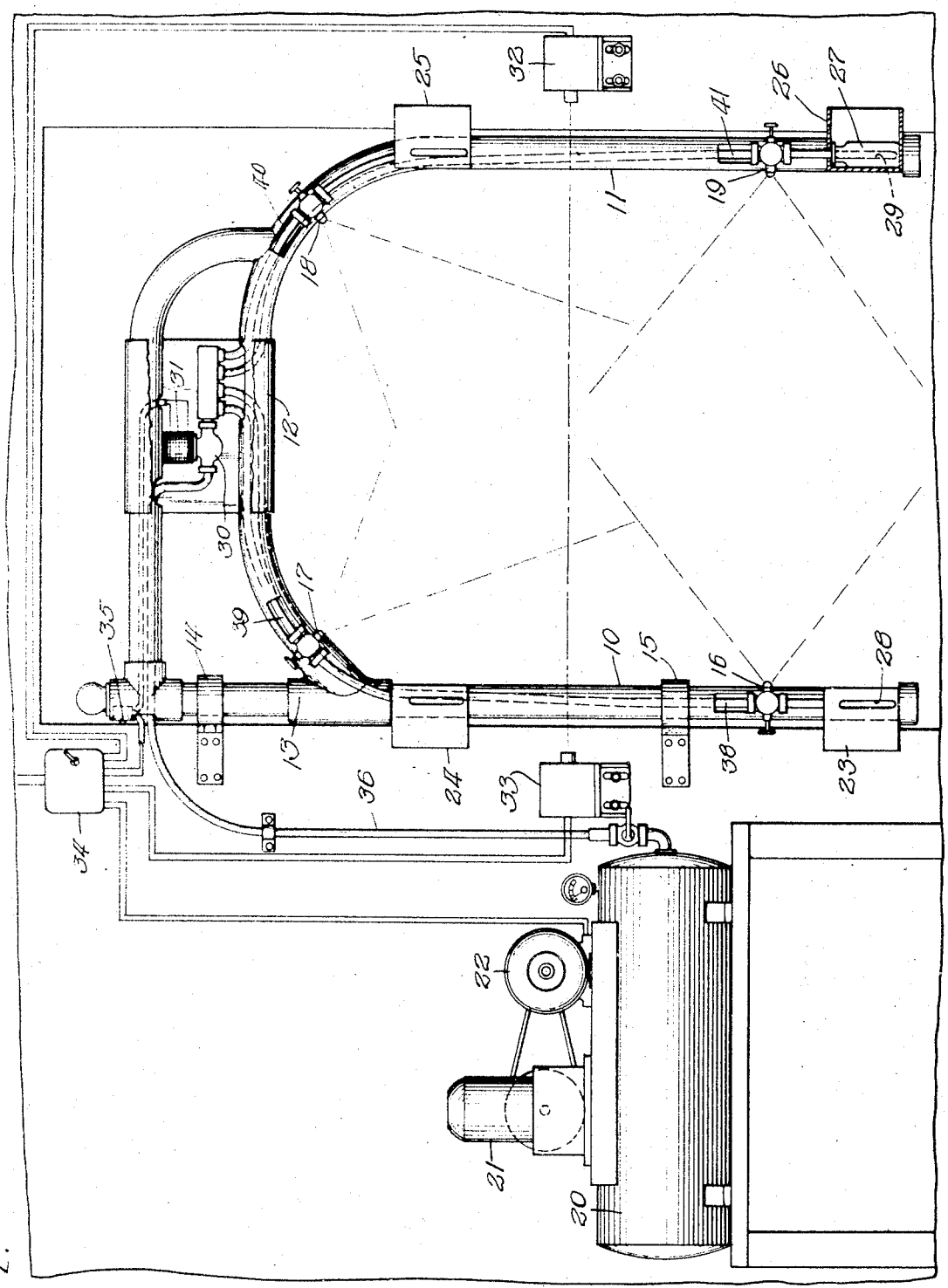

April 15, 1941.  G. C. MATHER ET AL  2,238,872

FLY CONTROL METHOD AND APPARATUS

Filed April 29, 1940  2 Sheets-Sheet 1

Inventors:
George C. Mather,
Russel S. Lingard,

April 15, 1941. G. C. MATHER ET AL 2,238,872
FLY CONTROL METHOD AND APPARATUS
Filed April 29, 1940     2 Sheets-Sheet 2
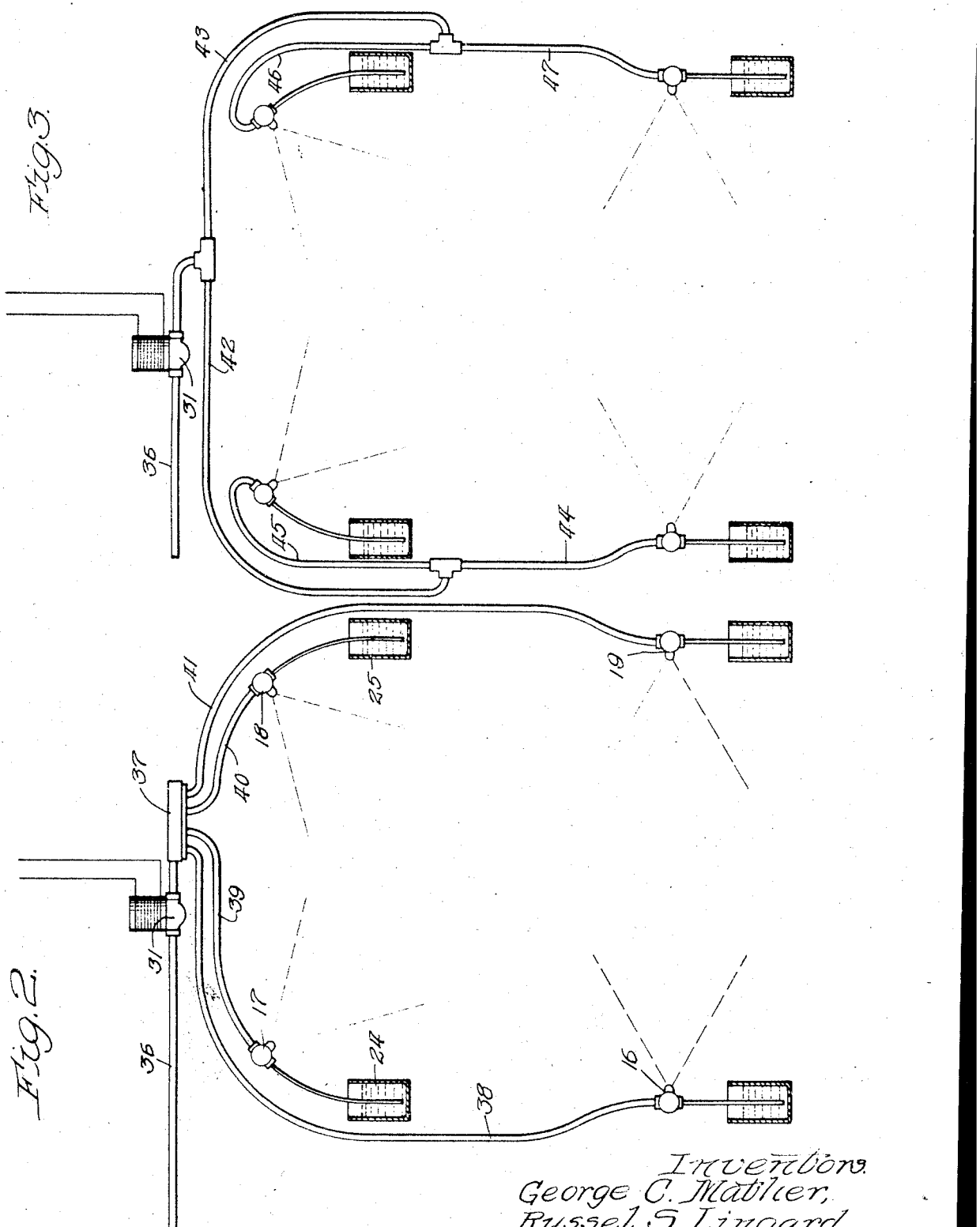
Inventors.
George C. Mather,
Russel S. Lingard,
By Christie, Wiles, Davies, Hirsch & Dawson,
Attys.

Patented Apr. 15, 1941

2,238,872

UNITED STATES PATENT OFFICE 2,238,872

FLY CONTROL METHOD AND APPARATUS

George C. Mather, Oak Park, and Russel S. Lingard, Chicago, Ill., assignors to Babson Bros. Co., a corporation of Illinois Application April 29, 1940, Serial No. 332,384

6 Claims. (Cl. 119—159)

This invention relates to a fly control method and apparatus, particularly for use with domestic animals, as dairy cows.

One feature of this invention is that it provides means for automatically periodically spraying animals with a liquid harmful to insects, such as flies; another feature of this invention is that it provides means for effectively eliminating the carrying in of flies when animals return from pasture to a barn; a further feature of this invention is that it is simple in operation, rugged, and requires very little attention or maintenance; other features and advantages of this invention will be apparent from the following specification and the drawings, in which:

Figure 1 is a view, principally in elevation, of apparatus embodying our invention; Figure 2 is a diagrammatic view of means for supplying the spray nozzles with air and a liquid harmful to insects; and Figure 3 is a diagrammatic view of modified supply means.

The proper control of insects harmful to domestic animals is a very important part of a well-run farm, particularly in the case of dairy farms. In certain months of the year, and particularly in certain parts of the country, swarms of flies feed upon dairy cows and cause a drop in their milk production of from ten to thirty per cent. In certain parts of the country, as in northern Texas, swarms of flies have been known to kill more than a dozen healthy vigorous cows or steers. The house-fly is principally merely an irritant of the cattle; but the other two types of fly, the horn-fly or cattle-fly, and the stable-fly, are voracious feeders on animal blood.

This problem has, of course, been recognized, and there are a number of liquids of various type and effectiveness available on the commercial market for use in spraying on the animals. Effective fly control, however, requires more than a mere casual use of a hand spray-gun once or twice a week, which is now about all that is done. A dairy barn should be tightly screened to keep out all flies which are not brought in on the animals; and preferably electric screens should be used to kill such flies as do get inside. More important, however, is that some means must be provided for effectively preventing flies from being carried in when the cows return from pasture; and for spraying the cows thoroughly and completely a couple of times a day with a liquid which kills any flies which may be on them, and acts as a repellant for a number of hours thereafter.

Our present invention provides method and apparatus for automatically accomplishing this important part of fly control. Generally stated, it comprises the provision of a restricted opening or passageway through which the animals are passed; and means around the passageway for directing toward the passing cow, from all sides, a spray of a liquid harmful to the flies.

Referring now more particularly to the embodiment of our invention illustrated in Figures 1 and 2, it will be seen that a relatively narrow passageway is provided between a pair of upright confining members 10 and 11, here forming part of a yoke having an upper portion 12. These are preferably of tubing or pipe, joined together in any convenient manner, as by welding or by connectors such as 13. One upright member, as 10, is here shown as mounted on one side of the barn doorway, as by the hinges 14 and 15. This enables the yoke to be swung back away from the door, if desired.

The yoke carries a plurality of spray nozzles, here shown as the four nozzles 16, 17, 18 and 19. These are all supplied, through appropriate piping, with air under pressure from a single source. This source is here shown as a storage tank 20 operatively connected with a pump 21 driven by an electric motor 22. Automatic means of some kind, as a pressure actuated switch, insures maintenance of a desired air pressure in the storage tank. This pressure may, for example, be fifteen or twenty pounds gage pressure. The spray nozzles are in one plane, all being carried by the yoke; and are so directed that their spray lies substantially entirely in a plane passing through the yoke uprights. They are so spaced around the yoke that when all four are in operation an animal passing under the yoke is sprayed on the top, sides, stomach and legs.

Means for supplying each of the nozzles with a liquid harmful to insects, and particularly flies, is also provided. The yoke carries, immediately below each of the spray nozzles, boxes or cabinets 23, 24, 25 and 26. These are adapted to house a container for the liquid, as a two-quart glass jar 27; and are provided with sighting slots, as 28, to enable ready determination of the amount of liquid in the containers at all times. The spray nozzles employed are preferably of the suction type; and suction tubes, as 29, lead from the nozzles down into the liquid containers.

The supply of air to all of the nozzles is simultaneously controlled by a single automatic valve 30, here shown as of the type actuated by a solenoid 31. The valve is so arranged as to be normally closed; but is opened by energization of the solenoid.

Control means is provided for automatically opening the valve each time an animal passes through the yoke. The control means is of the type wherein a beam of light is broken by the passing animal. A source of a narrow concentrated beam of light, as the light-generating device 32, is located on one side of the yoke; and light-sensitive means 33 is located on the other side of the yoke in the pathway of the beam generated by the device 32. This light-sensitive device may be of the conventional commercial type including a photo-electric tube, amplifying means, and relay means. The arrangement is such that when the beam strikes the photo-electric tube the relay is open; but when the beam is broken, as by a passing animal, the relay closes to energize the solenoid 31. The various wiring, as for example, the current supply sources for the motor 22, the light-generating means 32, and the light-sensitive device 33, and solenoid 31, are preferably all supplied from a single conventional source of current, and controlled by a manual switch, as the box-type switch 34. The circuit also preferably includes a plunger type switch 35, so arranged that the circuit is closed only when the yoke is in position in the doorway as shown, and is automatically broken when the yoke is swung out of operative position.

While the sprays used are generally not definitely harmful to the eyes of a cow, they are irritating; and it is preferable to start spraying after the eyes of the cow are past the plane of the spray. This may be readily effected by having the beam of light low enough that it will strike the lower part of the chest of the animal, so that the animal's eyes will be beyond the plane of the spray when the valve 30 is opened. The light beam control apparatus can also be so arranged that it is six or eight inches within the plane of the spray, so that when it is struck by the head of the animal the eyes are already past the spray plane. In this latter case the mounting of at least one of the elements 32 and 33 must be such as to conveniently permit it to be traversed from one side of the yoke to the other.

Turning next to Figure 2, the supply means is shown separately diagrammatically to provide a clearer illustration of its arrangement. The single air supply pipe 36 from the storage tank 20 passes through the automatic valve 31, and enters a connector 37 from which four independent pipes 38, 39, 40 and 41 lead to the spray nozzles 16, 17, 18 and 19. This provides a very simple and effective means of delivering air to the nozzles, and the suction pipes and containers supply the desired liquid.

In order to prevent any possible lag in the operation of the lower spray nozzles, an alternative air supply arrangement is shown diagrammatically in Figure 3. In this arrangement the single pipe 36, after having passed through the automatic valve 31, separates into the two supply pipes 42 and 43. Each of these runs down its particular side of the yoke to a point intermediate the two spray nozzles, and then each separates into supply pipes to the individual nozzles, as the pipes 44 and 45, and 46 and 47. In this arrangement the air flow path is of the same length and resistance from the automatic valve to each spray nozzle.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. Apparatus of the character described for controlling flies to prevent decrease in the production of dairy herds caused thereby, including: a pair of confining members between which the cows may be passed; a plurality of spray nozzles associated with said members and in a plane traversed by the cows; a source of air under pressure; means connecting said source with all of the nozzles; means for supplying the nozzles with a liquid harmful to the insects; an electrically actuated valve controlling flow of air to the nozzles, and thus generation of spray thereat; and control means automatically operative, upon passage of an animal between the confining members, to open the valve, the control means including a beam of light so located as to be broken by the cow after its eyes are beyond said plane.

2. Apparatus of the character claimed in claim 8, wherein the nozzles are of the suction type each supplied with liquid from an independent body of liquid.

3. Apparatus of the character claimed in claim 8, wherein the air supply passages, from the valve to each nozzle, are of the same length.

4. The method of spraying living beings with a liquid deleterious to insects which consists of placing an intangible medium across the path of movement of the beings, and causing intersection of the medium to initiate application of a spray of said liquid.

5. A method of spraying a domestic animal to decrease the settling of flies thereon which consists of placing an intangible medium across the path of movement of the animal, causing the animal to move in said path, and causing the medium to be interrupted when a portion of the animal intersects the medium, the intersection of the medium by the animal initiating the application of spray material on said animal.

6. Apparatus of the character described for controlling insects which pray upon domestic animals, including: confining members between which the animals may be passed; a plurality of spray nozzles associated with said members to provide spray from a number of points in one plane; a source of air under pressure; means connecting said source with all of the nozzles; means for supplying the nozzles with a liquid harmful to insects; an automatic valve controlling flow of air to the nozzles, and thus generation of spray thereat; and control means including a beam of light so placed as to be broken by the forepart of the animal, interrupting of the beam automatically and immediately opening the valve and initiating spray from said nozzles.

GEORGE C. MATHER.
RUSSEL S. LINGARD.